Patented Nov. 11, 1924.

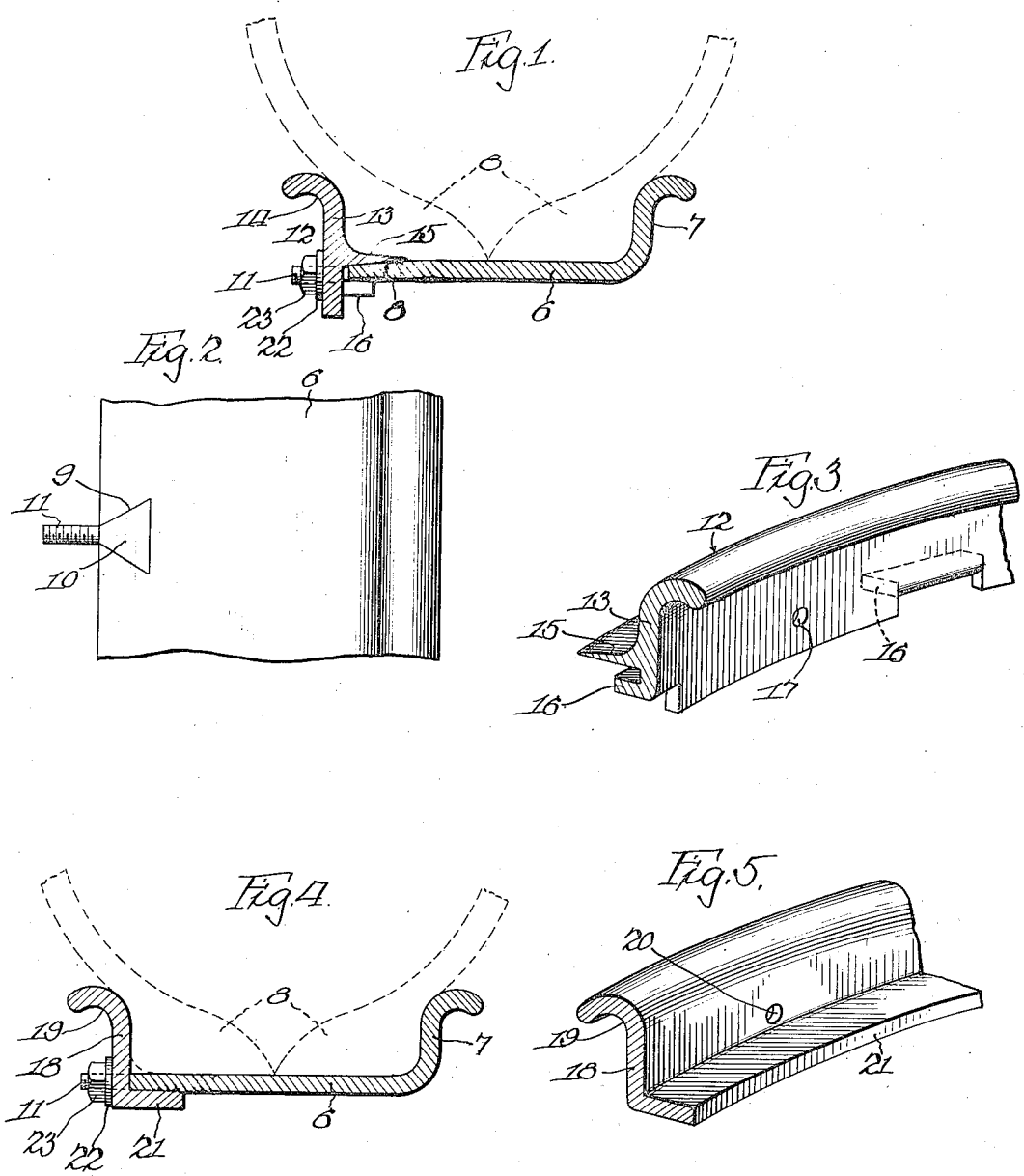

1,515,160

UNITED STATES PATENT OFFICE.

CLYDE S. MORSE, OF DE KALB, ILLINOIS, ASSIGNOR OF ONE-HALF TO EDWIN L. HARDY, OF WATERMAN, ILLINOIS.

DEMOUNTABLE RIM.

Application filed May 5, 1924. Serial No. 711,013.

*To all whom it may concern:*

Be it known that I, CLYDE S. MORSE, a citizen of the United States, and a resident of De Kalb, in the county of De Kalb and State of Illinois, have invented certain new and useful Improvements in Demountable Rims, of which the following is a specification.

This invention relates to improvements in demountable rims for automobile wheels, but is not restricted in its use to such wheels, as it may be employed in connection with the wheels of other kinds of machines, and has for its main object, to furnish a demountable rim of an extremely simple and inexpensive construction which can be readily and quickly secured to or on the inner periphery of a tire-casing or easily removed therefrom.

Another object of the invention is to provide a rim of such construction and arrangement of its parts as to enable it to be detachably and safely secured on the felly band of a wheel by the means and in the manner ordinarily employed for such purpose without any material change or alteration in said attaching means.

Another object is the provision of a two-piece or circumferentially split rim in which one of said pieces is equipped in a novel manner at one of its edges with screws for engagement with the other piece of the rim in joining them together.

Still another object is, the provision of a two-piece or circumferentially divided rim having means reenforcing and bracing them at their juncture, as well as, means far detachably locking them together.

Other objects and advantages of the invention will become more readily understood and clearly seen when read in conjunction with the accompanying drawing, in which embodiments of which the invention is susceptible, are illustrated, it being understood that alterations and changes therein can be resorted to without a departure from the spirit of the invention, so long as they fall within the scope of the appended claim forming a part hereof.

In the drawing,—

Figure 1 is a cross-sectional view of a rim embodying one form of the invention illustrating it mounted on the inner periphery of a tire-casing, which casing is shown in dotted lines.

Fig. 2 is a fragmental plan view of the main or body member of the rim showing one of the screws for the other member of the rim mounted thereon at one of its edges.

Fig. 3 is a fragmental perspective view of the other annular piece of the rim of the construction shown in Fig. 1.

Fig. 4 is a cross-sectional view similar to Fig. 1, illustrating a modification in the construction of the rim, and Fig. 5 is a fragmental perspective view of one of the pieces of the rim of the construction illustrated in Fig. 4.

Like numerals of reference refer to corresponding parts throughout the different views of the drawing.

Referring now more particularly to Figs. 1 to 3 inclusive of the drawing, the reference numeral 6 designates as a whole the main or body member or piece of the rim, which it will be understood is annular in shape and has at one of its edges an outwardly extended flange 7 to rest against one side of the inner peripheral portion of a tire-casing 8 which may be of the ordinary or any well known construction and which may be maintained in an inflated condition by means of an inner or pneumatic tube of a well known kind.

The main or body member 6 of the rim has its outer surface at its edge opposite the flange 7 beveled as at 8, see Fig. 1, and is provided at suitable distances apart with a series of dovetailed recesses 9 of any desired shape. In each of the recesses 9 is located the head 10 of a screw 11, which head, it will be understood, is of a corresponding shape to the recess 9 in which it is located and may be secured therein by welding process such as spot-welding or otherwise. When the heads 10 of the screws 11 are thus secured in place, it will be understood that the shanks of the screws will extend from the beveled edge of the member 6. The other member of the rim is designated as a whole by the numeral 12 and comprises an annular piece or ring 13 having its outer portion laterally curved or outwardly deflected as at 14 from the inner peripheral portion of the tire-casing 8 as will be readily understood by reference to Fig. 1 of the drawing.

On its side adjacent the beveled edge of the main or body member 6 of the rim the ring or member 13 is provided with an inwardly extended annular flange 15 which by preference has its surface adjacent the member 6 beveled to correspond with the beveled portion 8 of the last named member. Near its inner edge the ring or member 13 of the rim is provided with a series of spaced flanges 16 which extend in the same direction as the flange 15 but are spaced therefrom a suitable distance to permit the insertion of the beveled edge of the member 6 between the flange 15 and said series of flanges 16 as shown in Fig. 1 of the drawing. At suitable points to coincide or register with each of the screws 11 when the member 12 of the rim is being fitted to the beveled edge of the main or body portion 6 of the rim, the ring or member 13 is provided with a series of openings 17 for the reception of said screws, and it will be understood that said openings are located in the member 13 on a circumferential line between the flanges 15 and 16 so that the screws 11 will be guided into said openings in assembling the parts of the rim.

In Fig. 4 of the drawing is shown a modification in the construction of the rim which consists in employing a main or body portion 6ª of the rim of the same construction as above described and illustrated in Fig. 1, except that the beveled portion 8 near one edge of the member 6 is omitted. In this modified construction the other member of the rim comprises an annular member or ring 18 having its outer portion laterally inclined or outwardly deflected as at 19 and provided at suitable distances apart with a series of openings 20 to register with the screws 11 when the parts 6ª and 18 are joined together as shown in Fig. 4 of the drawing. The modified form of the annular member 18 has at its inner periphery a flange 21 which is co-extensive with the member 18 and is adapted to rest against the inner surface of the annular member 6ª or main portion of the rim, as is clearly shown in Fig. 4 of the drawing. In this modified construction it will be understood that the series of openings 20 in the annulus 18 are arranged in a circumferential line outwardly of the annular flange 21 so that when the members 6ª and 18 are assembled as shown in Fig. 4, the flange 21 will not only reinforce the portion 6ª adjacent the member 18, but will also act as a guide for causing the screws 11 to enter said openings, as it is obvious the ring or member 18 can be moved circumferentially on the member 6ª so as to bring the screws and openings 20 therefor into co-incidence with one another.

After the two members of the rim have been assembled as shown in Figs. 1 and 4 of the drawing, it is manifest that they can be firmly yet detachably secured together by means of a washer 22 surrounding each of the screws 11 on the outer side of the member 13 or 18 and by means of a nut 23 engaging each of said screws outwardly of the washer thereon.

By my improvements it is apparent that a demountable rim which can be mounted on the felly and its band of a wheel in the ordinary or any well known way of a very simple and inexpensive construction, is furnished, and also that a demountable rim which can be readily and quickly applied to a tire-casing or detached therefrom, is provided.

Having thus fully described my invention, what I claim as new and desire to secure by Letters Patent is:

A demountable rim comprising a pair of annular clamping members located side by side in co-incidence with one another, one of said members having on one of its sides a pair of spaced reinforcing and bracing portions located concentrically with respect to one another and also having between said portions a plurality of spaced openings, the other of said members having a plurality of spaced projections arranged in a circumferential row and extended from its edge adjacent the apertured member and through the openings of the latter, and detachable means engaging said projections on the outer surface of the apertured member.

CLYDE S. MORSE.